United States Patent
Xiang et al.

(10) Patent No.: US 11,953,313 B2
(45) Date of Patent: Apr. 9, 2024

(54) THREE-DIMENSIONAL MEASUREMENT DEVICE

(71) Applicant: CHENGDU PIN TAI DING FENG BUSINESS ADMINISTRATION, Sichuan (CN)

(72) Inventors: Qianwen Xiang, Sichuan (CN); Wanjia Ao, Sichuan (CN); Youmin Zhuang, Sichuan (CN); Ruojia Wang, Sichuan (CN); Zixin Xie, Sichuan (CN); Mintong Wu, Sichuan (CN); Ruihan Zhang, Sichuan (CN)

(73) Assignee: CHENGDU PIN TAI DING FENG BUSINESS ADMINISTRATION, Chengdu (CN)

( * ) Notice: Subject to any disclaimer, the term of this patent is extended or adjusted under 35 U.S.C. 154(b) by 421 days.

(21) Appl. No.: 17/306,953

(22) Filed: May 4, 2021

(65) Prior Publication Data
US 2021/0254969 A1     Aug. 19, 2021

Related U.S. Application Data

(63) Continuation of application No. PCT/CN2018/114611, filed on Nov. 8, 2018.

(51) Int. Cl.
*G01B 11/25*     (2006.01)
*G01B 11/22*     (2006.01)
(Continued)

(52) U.S. Cl.
CPC .......... *G01B 11/2509* (2013.01); *G01B 11/22* (2013.01); *G01B 11/2531* (2013.01);
(Continued)

(58) Field of Classification Search
None
See application file for complete search history.

(56) References Cited

U.S. PATENT DOCUMENTS

| 4,773,029 A | 9/1988 | Claesson et al. |
| 2004/0125205 A1* | 7/2004 | Geng .................... G01S 7/4912 348/142 |

(Continued)

FOREIGN PATENT DOCUMENTS

| CN | 1228526 A | 9/1999 |
| CN | 1419647 A | 5/2003 |

(Continued)

OTHER PUBLICATIONS

The extended European search report in counterpart European Application No. 18939238.4, dated Oct. 8, 2021.

(Continued)

*Primary Examiner* — Delomia L Gilliard

(57) ABSTRACT

Provided is a three-dimensional measurement device, including an illumination system (I) and an imaging system (II). The illumination system includes, along an illumination light path, a light source (8), a light beam shaping apparatus (8), a pattern modulation apparatus (6), and a projection lens (2). The pattern modulation apparatus is configured to form a coded pattern. The light beam shaping apparatus is configured to shape light emitted by the light source into near-parallel light. The projection lens is configured to project the coded pattern onto a target object. The imaging system includes an imaging lens (3), a first beam-splitting system (12, 13), and an image sensor group including N image sensors (9, 10, 11). The first beam-splitting system is configured to transmit the coded pattern received by the imaging lens and projected onto the target object to the N image sensors of the image sensor group.

16 Claims, 2 Drawing Sheets

(51) Int. Cl.
  *G01C 11/02* (2006.01)
  *G06T 7/521* (2017.01)
  *H04N 13/254* (2018.01)
(52) U.S. Cl.
  CPC .............. *G01C 11/02* (2013.01); *G06T 7/521* (2017.01); *H04N 13/254* (2018.05)

(56) References Cited

U.S. PATENT DOCUMENTS

| | | | |
|---|---|---|---|
| 2005/0035314 A1 | 2/2005 | Yamaguchi | |
| 2009/0284755 A1 | 11/2009 | Friemel | |
| 2014/0376064 A1 | 12/2014 | Rosberg et al. | |
| 2015/0103358 A1* | 4/2015 | Flascher | G01B 11/2513 356/603 |
| 2015/0117602 A1 | 4/2015 | Chen et al. | |
| 2016/0238377 A1 | 8/2016 | Palmen | |
| 2018/0299262 A1 | 10/2018 | Thiel et al. | |

FOREIGN PATENT DOCUMENTS

| | | | | |
|---|---|---|---|---|
| CN | 1668890 | A | 9/2005 | |
| CN | 101165471 | A | 4/2008 | |
| CN | 101881599 | A | 11/2010 | |
| CN | 202875522 | U | 4/2013 | |
| CN | 103228228 | A | 7/2013 | |
| CN | 103534581 | A | 1/2014 | |
| CN | 103884703 | A | 6/2014 | |
| CN | 103954602 | A | 7/2014 | |
| CN | 104253988 | A | 12/2014 | |
| CN | 104634277 | A | 5/2015 | |
| CN | 104634323 | A | 5/2015 | |
| CN | 104655051 | A | 5/2015 | |
| CN | 105333838 | A | 2/2016 | |
| CN | 205246014 | U | 5/2016 | |
| CN | 205317164 | U | 6/2016 | |
| CN | 105892257 | A | 8/2016 | |
| CN | 107796330 | A | 3/2018 | |
| CN | 108038898 | A | 5/2018 | |
| CN | 207675118 | U | 7/2018 | |
| CN | 112930468 | A | 6/2021 | |
| FR | 2869112 | A1 | 10/2005 | |
| GB | 2078944 | A | * 1/1982 | ......... G01B 11/2509 |
| GB | 2078944 | A | 1/1982 | |
| JP | H11148806 | A | 6/1999 | |
| JP | 2003528303 | A | 9/2003 | |
| JP | 2008170281 | A | 7/2008 | |
| JP | 2009025189 | A | 2/2009 | |
| JP | 2010525404 | A | 7/2010 | |
| JP | 2011191170 | A | 9/2011 | |
| JP | 2013245980 | A | 12/2013 | |
| JP | 2016045120 | A | 4/2016 | |
| JP | 2017037089 | A | 2/2017 | |
| JP | 2018515760 | A | 6/2018 | |
| JP | 2018515769 | A | 6/2018 | |
| WO | 2012129788 | A1 | 10/2012 | |

OTHER PUBLICATIONS

Notification to Grant Patent Right for Invention in counterpart China Application No. 201880098411.5, dated Oct. 26, 2022.
Notice of Reasons for Refusal in Japanese Patent Application No. 2021-547618, dated Dec. 20, 2022.
Notice of Reasons for Refusal in Japanese Patent Application No. 2021-547618, dated May 31, 2022.
Communication pursuant to Rule 71(3) EPC in European Patent Application No. 18 939 238.4, dated Jun. 10, 2022.
The First Office Action in counterpart China Application No. 201880098411.5, dated Jul. 4, 2022.
Yu, Li-Ping et al., "Single-Camera Three-Dimensional Digital Image Correlation using a Single Color Camera", Journal of Experimental Mechanics, Oct. 2017, vol. 32, No. 5, pp. 687-698, DOI: 10.7520/1001-4888-17-303.
Notice of Reasons for Refusal in Japanese Patent Application No. 2021-547618, dated Jun. 27, 2023.

* cited by examiner

THREE-DIMENSIONAL MEASUREMENT DEVICE

CROSS-REFERENCE TO RELATED APPLICATIONS

This application is a continuation of International Application No. PCT/CN2018/114611, filed on Nov. 8, 2018, which is hereby incorporated by reference in its entirety.

TECHNICAL FIELD

The present disclosure relates to a measurement device, and more particularly, to a three-dimensional measurement device.

BACKGROUND

In recent years, optical-based three-dimensional measurement technology has developed relatively rapidly, and it has made breakthroughs in terms of several technical routes such as optical components, mechanical devices, and processing algorithms for measurement data. The established or to-be-established measurement technologies including, for example, structured light vision measurement, Phase Measuring Profilometry (PMP), confocal scanning, and digital speckles are also emerging. Consequently, three-dimensional measurement is widely applied to many fields such as industry, manufacturing, and even daily life. For example, some devices are suitable for measurement of large and medium-sized objects, and some devices are suitable for measurement of small and micro objects; some devices require extremely high measurement accuracy, and some devices require general measurement accuracy; some devices are suitable for measurement in open spaces, and some devices are suitable for measurement in narrow cavities or passage spaces; and some devices need an additional function such as presenting color texture information while completing three-dimensional measurement. At present, the above exemplary three-dimensional measurement devices with different application ranges are almost all independent dedicated devices. In order to satisfy different measurement requirements, different dedicated three-dimensional measurement devices are required to be manufactured, which results in high costs in design and manufacturing of the devices.

In addition, the encoding method and device implementation manners for single-frame (multi-spectral) measurement are known in the related art, referring to patent CN108038898A (titled METHOD FOR CODING AND DECODING SINGLE-FRAME BINARY STRUCTURED LIGHT) and patent CN104634323B (titled THREE-DIMENSIONAL PHOTOGRAPHING SYSTEM AND METHOD FOR MULTI-STAGE PHOTOGRAPHING). However, mainstream companies such as Planmeca Oy and Raycus still use multi-frame time division to realize three-dimensional point clouds, which has low efficiency in the formation of three-dimensional measurement data.

In view of the above, the present disclosure aims to provide a three-dimensional measurement device with a simple and compact structure, capable of performing the single-frame (multi-spectral) measurement; and the present disclosure also aims to provide a three-dimensional modular measurement device that is easy to be modified, which is easy to manufacture a three-dimensional measurement device satisfying a variety of measurement requirements.

SUMMARY

For the above objects, the present disclosure provides a three-dimensional measurement device. The three-dimensional measurement device includes an illumination system (I) and an imaging system (II). The illumination system (I) includes, along an illumination light path, a light source (8), a light beam shaping apparatus (7), a pattern modulation apparatus (6), and a projection lens (2). The pattern modulation apparatus (6) is configured to form a coded pattern. The light beam shaping apparatus (7) is configured to shape light emitted by the light source (8) into near-parallel light. The projection lens (2) is configured to transmit the coded pattern to a target object. The imaging system (II) includes, along an imaging optical path, an imaging lens (3), a first beam-splitting system, and an image sensor group including N image sensors. The first beam-splitting system is configured to transmit the coded pattern projected onto the target object and received by the imaging lens (3) to the N image sensors of the image sensor group, to form N image signals.

DESCRIPTION OF EMBODIMENTS

In order to explain objects, technical solutions, and advantages of embodiments of the present disclosure, technical solutions according to the embodiments of the present disclosure will be clearly and thoroughly described below in combination with accompanying drawings of the embodiments of the present disclosure. Obviously, the embodiments described below are only a part of the embodiments of the present disclosure, rather than all of the embodiments. On basis of the embodiments in the present disclosure, all other embodiments acquired by those skilled in the art without creative effort shall fall within the protection scope of the present disclosure.

Figure 1:
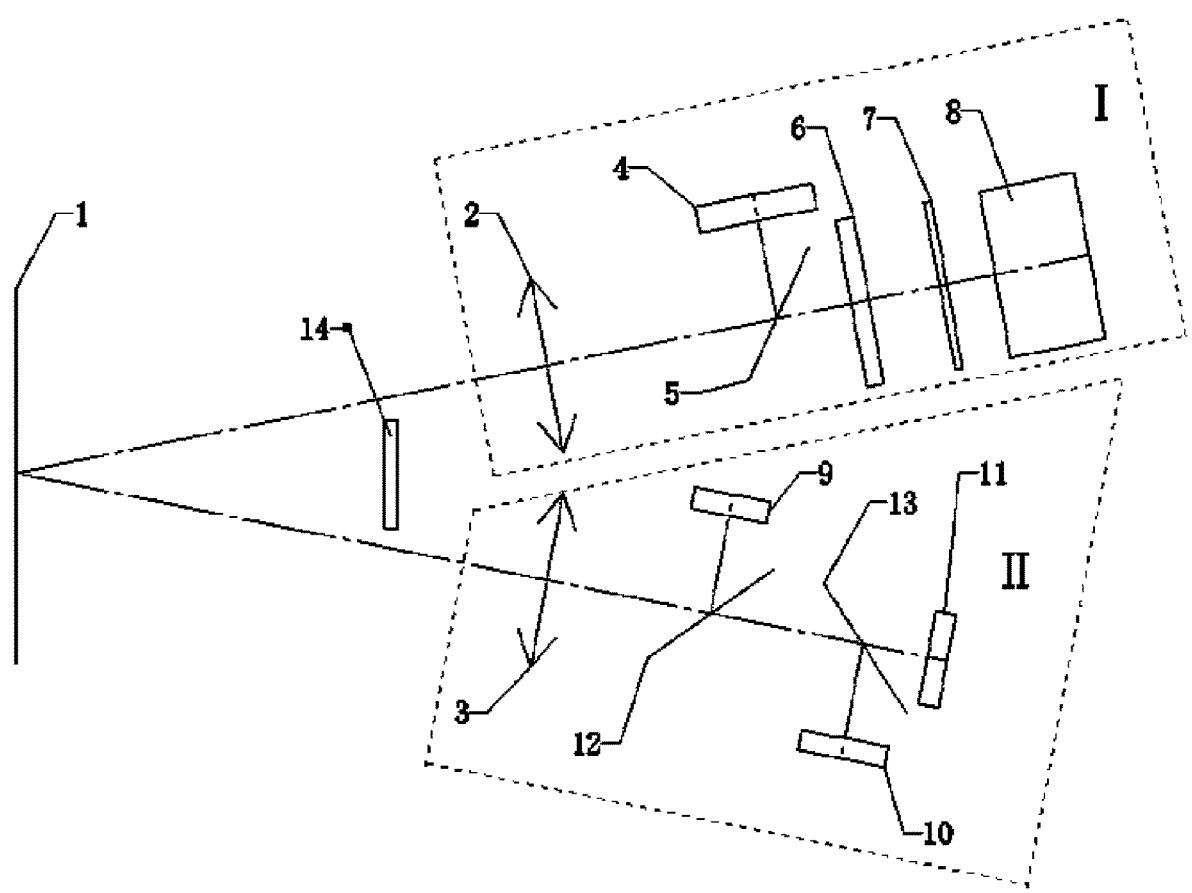
FIG. 1 is a structural schematic diagram of a three-dimensional measurement device according to Embodiment 1 of the present disclosure.

As illustrated in FIG. 1, Embodiment 1 of the present disclosure provides a three-dimensional measurement device. Similar to the related art, the three-dimensional measurement device of the present disclosure also includes an illumination system (I) and an imaging system (II).

In the present embodiment, the illumination system (I) includes a light source (8), a light beam shaping apparatus (7), a pattern modulation apparatus (6), and a projection lens (2) that are arranged along an illumination light path. The light beam shaping apparatus (7) is configured to shape light emitted by the light source (8) into uniform near-parallel light. In this embodiment, the near-parallel light is defined to include parallel light, and light that is not exactly parallel but only has tolerable industrial errors. With the light beam shaping apparatus (7), a divergent light beam emitted by the light source can be shaped into the uniform near-parallel light to improve a utilization rate of the light source. The pattern modulation apparatus (6) is configured to form a coded pattern. That is, the near-parallel light can form the coded pattern when passing through or irradiating the pattern modulation apparatus (6). The projection lens (2) is configured to project the coded pattern formed by the pattern modulation apparatus (6) onto a target object (1).

According to an embodiment, the light source (8) is an N-color light source, where N=1 or N>1.

According to an optional implementation of the present embodiment, when N=1, the light source (8) is substantially a monochromatic light source, and it may physically include a monochromatic LED or a monochromatic laser. Correspondingly, the pattern modulation apparatus (6) is a single-spectrum pattern modulation apparatus, which may physically include a grating, a DMD, a projection pattern film, or a diffractive optical element.

According to a preferred implementation of an embodiment, when N>1, the light source (8) is a combined light source, which may physically include a white light source, an RGB light source (i.e., a light source formed by combining light of three colors of Red, Green, and Blue (RGB)), a combined light source of N monochromatic LEDs, or a combined light source of N monochromatic lasers. Correspondingly, the pattern modulation apparatus (6) is a multi-spectral pattern modulation apparatus, which may physically include a grating, a DMD, and a projection pattern film. Further, when the light source (8) includes the combined light source of the N monochromatic LEDs or the N monochromatic lasers, and the pattern modulation apparatus (6) is an N-spectral pattern modulation apparatus.

In an embodiment, the light beam shaping apparatus (7), in combination with the light source (8), can be any apparatus known in the related art that can shape a light beam into parallel light. Preferably, when the light source (8) includes an LED light source (such as a monochromatic LED light source or a combined LED light source), the light beam shaping apparatus (7) may include a collimating element. When the light source (8) includes a laser light source (such as a monochromatic laser light source or a combined laser light source), the light beam shaping apparatus (7) may include a collimating element and an elimination element. The above-mentioned collimating element is configured to shape the light emitted by the light source into near-parallel light, and it can be physically implemented as a lens or a diffractive optical element. The elimination element is configured to eliminate coherence of the light emitted by the laser light source, such that the near-parallel light presents a spatially uniform distribution along the illumination light path. Optionally, the elimination element can be physically implemented as a static homogenization piece or a motor-driven dynamic homogenization piece (homogenization wheel).

According to the present embodiment, the imaging system (II) includes, along an imaging optical path, an imaging lens (3), a first beam-splitting system, and an image sensor group including N image sensors. The first beam-splitting system is configured to transmit the coded pattern projected onto the target object (1) and received by the imaging lens (3) to the N image sensors of the image sensor group, so as to form N image signals.

According to an optional implementation of the present embodiment, when N=1, the first beam-splitting system may not be used. That is, the beam-splitting is not necessary. Also, the image sensor group is reduced to one image sensor.

According to another optional implementation of the present embodiment, when N>1, the first beam-splitting system includes N−1 beam splitters located on the imaging optical path. For example, when N=2, the first beam-splitting system is implemented as a beam splitter on the imaging optical path.

According to a preferred implementation of the present embodiment, when N>2, the N−1 beam splitters in the first beam-splitting system are parallel to each other or alternately perpendicular to each other. One of the N image sensors is located on the imaging optical path, and the remaining N−1 image sensors are located on a same side of the imaging optical path or alternately located on reflective light paths of the N−1 beam splitters on two sides of the imaging optical path. According to an embodiment, the beam splitters are all spectral beam splitters. That is, on a beam-splitting surface, the spectrum of a specific wavelength is allowed to be reflected, and spectra of other wavelengths are transmitted.

As illustrated in FIG. 1, in a preferred implementation of the present embodiment where N=3, the first beam-splitting system includes a first beam splitter (12) and a second beam splitter (13) that are perpendicular to each other on the imaging optical path. The image sensor group includes three image sensors, i.e., a first image sensor (9), a second image sensor (10), and a third image sensor (11).

According to an embodiment, the image sensor may include a color image sensor or a black-white image sensor. The black-white image sensor is preferable. Further, a front of each black-white image sensor corresponds to a filter of a monochromatic light spectrum in the combined light source (8), such that the image sensor can acquire imaging information of corresponding monochromatic light in the combined light source (8).

According to an embodiment, the target object (1) illuminated by a light beam having the coded pattern and projected by the projection lens (2) transmits image signals of the illuminated target object (1) along the imaging optical path to the first image sensor (9) to the second image sensor (10), and the third image sensor (11) through the imaging lens (3), the first beam splitter (12), and the second beam splitter (13). In this way, all the information about the coded pattern projected onto the target object (1) can be acquired. Through parsing and processing of the images, three-dimensional data of the target object (1) can be acquired.

Figure 2:
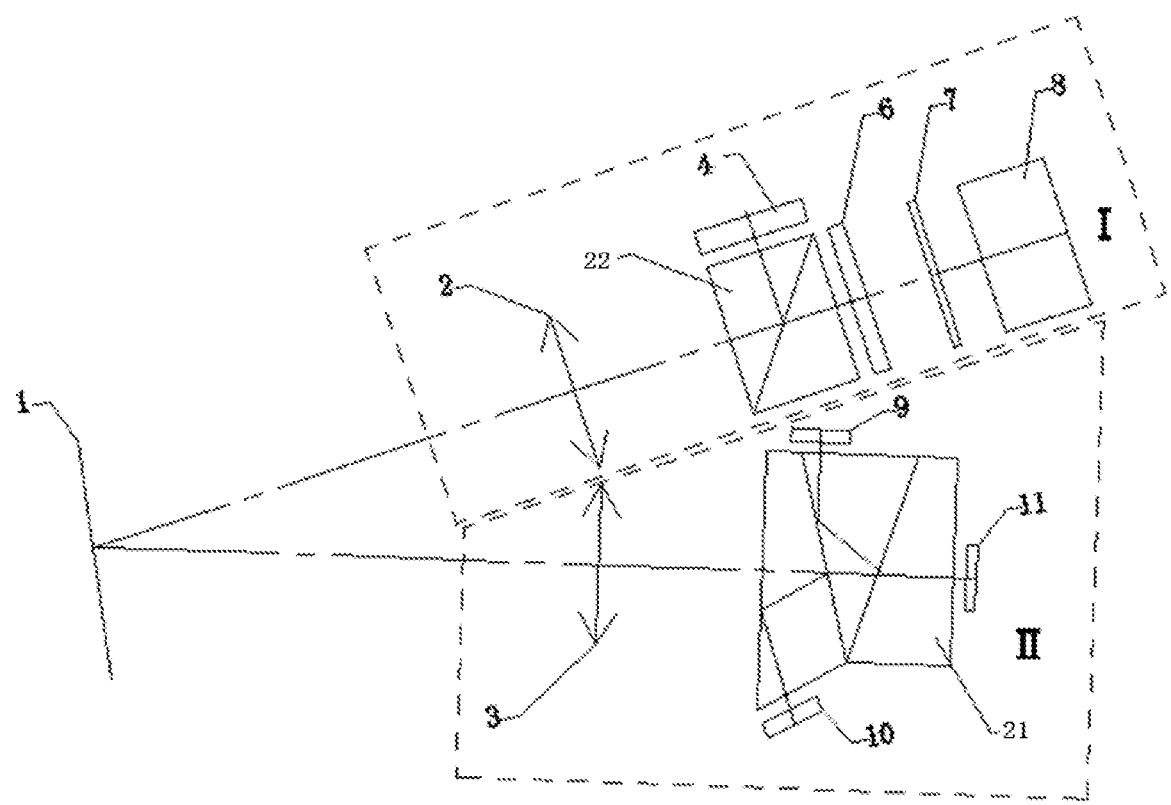
FIG. 2 is another structural schematic diagram of a three-dimensional measurement device according to Embodiment 1 of the present disclosure, including but not illustrating an illuminating apparatus (14).

As illustrated in FIG. 2, in a preferred implementation of an embodiment where N=3, the first beam-splitting system includes a prism (21) located on the imaging optical path. That is, the first beam splitter (12) and the second beam splitter (13) are replaced by the prism (21). In this way, the target object (1) illuminated by a light beam having the coded pattern and projected by the projection lens (2) transmits image signals of the illuminated target object (1) along the imaging optical path to the first image sensor (9), the second image sensor (10), and the third image sensor (11) through the imaging lens (3) and the prism (21) for beam splitting. In this way, all the information about coded pattern projected onto the target object (1) can be acquired. Through parsing and processing of images, three-dimensional data of the target object (1) can be acquired.

According to Embodiment 1 of the present disclosure, optionally, as illustrated in FIG. 1, the three-dimensional measurement device further includes an illuminating apparatus (14) for illuminating the target object (1). Preferably, the illuminating apparatus (14) includes a white monochromatic LED light source or a monochromatic RGB time-division light source. According to an implementation of the present embodiment, the illuminating apparatus (14) physically includes a plurality of LEDs that are uniformly distributed, so as to directly illuminate the target object (1). In another implementation, the illuminating apparatus (14) includes an LED, and an optical fiber and/or a lens capable of transmitting light emitted by the LED to the target object (1). In this way, under illumination of the illuminating apparatus (14), RGB colors of the target object (1) can be acquired through the first image sensor (9), the second image sensor (10), and the third image sensor (11), respectively, thereby composing a color texture image of the target object (1). Further, in combination with the acquired three-dimensional data of the target object (1), color three-dimensional data of the target object (1) can be acquired.

According to Embodiment 1 of the present disclosure, optionally, as illustrated in FIG. 1, the illumination system (I) of the three-dimensional measurement device further includes a texture image sensor (4) and a second beam-splitting system. The second beam-splitting system is located on the illumination light path and configured to enable the texture image sensor to acquire a surface image signal of the target object (1). Optionally, the second beam-splitting system includes a texture beam splitter (5) as illustrated in FIG. 1, or a texture prism (22) as illustrated in FIG. 2. The texture image sensor (4) is located on a reflective light path of the texture beam splitter (5), or on a reflective light path of the texture prism (22). In this way, a surface condition of the target object (1) can be observed easily through the texture image sensor (4). According to an embodiment, preferably, the texture image sensor includes a color image sensor configured to acquire a color image signal of a surface of the target object (1). In this way, in addition to observing the target object, the texture image sensor (4) can also acquire the color texture image of the target object (1), and in combination with the acquired three-dimensional data of the target object (1), the texture image sensor (4) can further acquire color three-dimensional data of the target object (1). As mentioned above, the texture beam splitter (5) can be a voltage-controlled beam splitter, or can be formed by plating a beam-splitting film. Transmitted light of the texture beam splitter (5) is much greater than reflected light thereof, thereby ensuring accuracy and efficiency of acquiring the three-dimensional data. Preferably, the transmitted light in the texture beam splitter (5) is not less than 70% of total light, and the reflected light is not higher than 30% of the total light.

According to Embodiment 2 of the present disclosure, a three-dimensional measurement device is provided, in which the texture image sensor (4) in the illumination system (I) and the image sensor group in the imaging system (II) as illustrated in FIG. 1 or FIG. 2 can be used as binoculars of the three-dimensional measurement system. The illuminating apparatus (14) is configured to illuminate the target object (1), so as to acquire the three-dimensional data of the target object (1) based on a principle of binocular stereo imaging.

According to Embodiment 3 of the present disclosure, two illumination systems (I) and one imaging system (II) as illustrated in FIG. 1 or FIG. 2 are used to form a three-dimensional measurement system performing two times of projections and one time of reception. Specifically, the three-dimensional measurement system includes a first illumination system, a second illumination system, and an imaging system, thereby acquiring the three-dimensional data of the target object (1).

According to Embodiment 4 of the present disclosure, one illumination system (I) and two imaging systems (II) as illustrated in FIG. 1 or FIG. 2 are used to form a three-dimensional measurement system performing one time of projection and two times of receptions. Specifically, the three-dimensional measurement system includes an illumination system, a first imaging system, and a second imaging system, thereby acquiring the three-dimensional data of the target object (1).

Through Embodiment 2, Embodiment 3, and Embodiment 4, it can be seen that, on basis of the technology of Embodiment 1 of the present disclosure, a three-dimensional measurement device can be easily developed to meet other measurement requirements.

The above are only preferred embodiments of the present disclosure, but are not intended to limit the present disclosure in any way. Any simple modifications or equivalent change made to the above embodiments based on technical essence of the present disclosure shall fall within the protection scope of the present disclosure.

What is claimed is:

1. A three-dimensional measurement device, comprising:
an illumination system (I); and
an imaging system (II),
wherein the illumination system (I) comprises, along an illumination light path, an N-color light source (8), a light beam shaping apparatus (7), a pattern modulation apparatus (6), and a projection lens (2), wherein the pattern modulation apparatus (6) is a N-spectrum pattern modulation apparatus and is configured to form a coded pattern comprising N spectral channels, the light beam shaping apparatus (7) is configured to shape light emitted by the light source (8) into near-parallel light, and the projection lens (2) is configured to project the coded pattern onto a target object; and
wherein the imaging system (II) comprises, along an imaging optical path, an imaging lens (3), a first beam-splitting system, and an image sensor group comprising N image sensors, wherein the first beam-splitting system is configured to transmit the coded pattern projected onto the target object (1) and received by the imaging lens (3) to the N image sensors of the image sensor group, to form N image signals,
wherein the illumination system (I) further comprises a texture image sensor (4) and a second beam-splitting system, the second beam-splitting system is located on the illumination light path and configured to enable the texture image sensor (4) to acquire a surface image signal of the target object (1).

2. The three-dimensional measurement device according to claim 1, wherein the first beam-splitting system comprises N−1 beam splitters located on the imaging optical path,
the N−1 beam splitters are parallel to each other or alternately perpendicular to each other; one of the N image sensors is located on the imaging optical path, and the remaining N−1 image sensors are located on a same side of the imaging optical path or alternately located on reflective light paths of the N−1 beam splitters on two sides of the imaging optical path.

3. The three-dimensional measurement device according to claim 2, wherein N=3; the image sensor group comprises a first image sensor (9), a second image sensor (10), and a third image sensor (11); the first beam-splitting system comprises a first beam splitter (12) and a second beam splitter (13) that are located on the imaging optical path.

4. The three-dimensional measurement device according to claim 3, wherein the first image sensor (9) is located on the reflective light path of the first beam splitter (12), the second image sensor (10) is located on the reflective light path of the second beam splitter (13), and the third image sensor (11) is located on a transmission light path of the first beam splitter (12) and the second beam splitter (13).

5. The three-dimensional measurement device according to claim 4, wherein the first image sensor (9), the second image sensor (10), and the third image sensor (11) acquire information about the coded pattern projected on the target object (1) for parsing three-dimensional data at a first time point, and respectively acquire RGB colors capable of composing a color texture image on the target object (1) at a second time point.

6. The three-dimensional measurement device according to claim 3, wherein the image sensor is a black-white image sensor.

7. The three-dimensional measurement device according to claim 3, wherein the light source (8) comprises a white light source, and the three-dimensional measurement device further comprises an illuminating apparatus (14) for illuminating the target object (1).

8. The three-dimensional measurement device according to claim 7, wherein the illuminating apparatus (14) comprises a white monochromatic LED light source, or a monochromatic RGB time-division light source.

9. The three-dimensional measurement device according to claim 3, wherein the first image sensor (9), the second image sensor (10), and the third image sensor (11) acquire information about the coded pattern projected on the target object (1) for parsing three-dimensional data at a first time point, and respectively acquire RGB colors capable of composing a color texture image on the target object (1) at a second time point.

10. The three-dimensional measurement device according to claim 1, wherein N=3; the image sensor group comprises a first image sensor (9), a second image sensor (10), and a third image sensor (11); the first beam-splitting system comprises a prism (21) located on the imaging optical path, and an image signal of the illuminated target object (1) is transmitted to the first image sensor (9), the second image sensor (10), and the third image sensor (11) through light splitting of the prism (21).

11. The three-dimensional measurement device according to claim 10, wherein the first image sensor (9), the second image sensor (10), and the third image sensor (11) acquire information about the coded pattern projected on the target object (1) for parsing three-dimensional data at a first time point, and respectively acquire RGB colors capable of composing a color texture image on the target object (1) at a second time point.

12. A measurement system, comprising the three-dimensional measurement device according to claim 1, further comprising a second illumination system identical to the illumination system (I).

13. A measurement system, comprising the three-dimensional measurement device according to claim 1, further comprising a second imaging system identical to the imaging system (II).

14. The three-dimensional measurement device according to claim 1, wherein the light source (8) comprises a combined light source of N monochromatic LEDs, the light beam shaping apparatus (7) comprises a collimating element, and the collimating element is configured to shape light emitted by the combined light source into near-parallel light.

15. The three-dimensional measurement device according to claim 1, wherein the light source (8) comprises a combined light source of N monochromatic lasers, the light beam shaping apparatus (7) further comprises a collimating element and an elimination element, the collimating element is configured to shape light emitted by the combined light source into near-parallel light, and the elimination element is configured to eliminate coherence of the light emitted by the combined light source.

16. The three-dimensional measurement device according to claim 1, wherein the second beam-splitting system comprises a texture beam splitter (5) or a texture prism (22), and the texture image sensor (4) is located on a reflective light path of the texture beam splitter (5) or a reflective light path of the texture prism (22).

* * * * *